United States Patent [19]
Azumi et al.

[11] Patent Number: 5,587,869
[45] Date of Patent: Dec. 24, 1996

[54] HIGH-VOLTAGE CAPACITOR MANUFACTURING METHOD AND HIGH-VOLTAGE CAPACITOR

[75] Inventors: Takeshi Azumi; Osamu Yamaoka; Kazuyuki Kubota, all of Nagaokakyo, Japan

[73] Assignee: Murata Manufacturing Co., Ltd., Kyoto-fu, Japan

[21] Appl. No.: 390,482

[22] Filed: Feb. 17, 1995

[30] Foreign Application Priority Data

Feb. 17, 1994 [JP] Japan .................................. 6-020538
Nov. 1, 1994 [JP] Japan .................................. 6-293944

[51] Int. Cl.$^6$ .......................... H01G 4/002; H01G 4/005; H01G 4/224
[52] U.S. Cl. .................. 361/301.3; 361/303; 361/306.1; 361/307; 361/309; 361/308.1
[58] Field of Search ................................ 361/301.3, 306, 361/307–310, 320, 321, 301.1, 311, 321.1, 321.4; 29/25.42

[56] References Cited

U.S. PATENT DOCUMENTS

| | | | |
|---|---|---|---|
| 4,221,033 | 9/1980 | Tobayashi | 29/25.42 |
| 4,771,363 | 9/1988 | Kellerman. | |
| 4,931,899 | 6/1990 | Pruett. | |

FOREIGN PATENT DOCUMENTS

| | | |
|---|---|---|
| 655166 | 12/1966 | Germany. |
| 3546425 | 7/1987 | Germany. |

OTHER PUBLICATIONS

Ziarno, G.: Silikone für das Einbetten und Umhüllen elektronischer Bauelemente [Silicone for Embedding and Encasing Electronic Components]: Elektronik, 1968, No. 2, pp. 33–36.

Heitz, E.: Einbettmassen mit geringer Dichte für elektronische Bauteile [Embedding Materials with Low Density for Electronic Components]. In: Electronik Industrie 1972, No. 5/6, pp. EP 41–EP 45.

Primary Examiner—Michael W. Phillips
Assistant Examiner—Anthony Dinkins
Attorney, Agent, or Firm—Wenderoth, Lind & Ponack

[57] ABSTRACT

A high-voltage capacitor is not deteriorated by any of a laser medium gas, ultraviolet rays, and discharge plasma of a gas laser device. Inside a hermetic casing is stored a capacitor body having an electrode which is connected to an external terminal. The external terminal includes a passageway therein which makes the inside of the hermetic casing communicate with the outside of the hermetic casing. The external terminal is led to the outside of the hermetic casing from the capacitor electrode, and gas inside the hermetic casing is discharged through the passageway of the external terminal to achieve a reduced pressure. Thereafter, the inside of the hermetic casing is filled with an insulating protection material. With the hermetic casing being made of alumina and the electrode terminal plated with nickel, deterioration due to ultraviolet rays or discharge plasma generated by an electric discharge of the laser device is prevented, thereby not contaminating the ambient gas.

16 Claims, 5 Drawing Sheets

HIGH-VOLTAGE CAPACITOR MANUFACTURING METHOD AND HIGH-VOLTAGE CAPACITOR

BACKGROUND OF THE INVENTION

1. Field of the Invention

The present invention relates to a high-voltage capacitor manufacturing method and to a high-voltage capacitor appropriate for use in an ambient gas of a gas laser device.

2. Description of the Prior Art

There has been conventionally used a high-voltage capacitor as shown in FIG. 8 for the purpose of exciting an electric discharge in a high-voltage carbon dioxide gas laser, an excimer laser, or the like. The high-voltage capacitor 17 is provided with electrodes 2 formed on both end surfaces of a capacitor element 1 made of a dielectric ceramic and external terminals 3 connected respectively to the electrodes 2. The high-voltage capacitor 17 has an insulating protection structure achieved by covering the entire periphery of the body of the capacitor except for the outer end portions of the external terminals 3 with an insulating protection material 15 made of a mold resin such as epoxy based resin.

The high-voltage capacitor is generally used in the atmosphere, however, in an excimer laser, there has been a growing trend of placing the high-voltage capacitor in a laser chamber filled with a laser medium gas composed principally of XeCl or KrF in order achieve an improved oscillation efficiency.

However, in the conventional high-voltage capacitor 17, a highly corrosive halogen gas such as $Cl_2$ and $F_2$ generated in the laser medium gas reacts with the insulating protection material 15, resulting in deterioration of the laser medium gas which serves as an ambient gas and deterioration of the insulation property of the insulating protection material 15. As a countermeasure for the aforementioned problem, the present inventor has proposed a high-voltage capacitor as disclosed in Japanese Utility Model Laid-Open publication No. HEI 03-34957. Referring to FIG. 9, a high-voltage capacitor 18 is formed by enclosing the periphery of a capacitor body 5c with a casing 6 made of a material such as fluororesin or alumina ceramic having a high corrosion resistance, filling an internal space with an insulating protection material 15 made of a mold resin such as epoxy resin, and leading external terminals 3 to the outside of the casing 6.

In injecting a mold resin such as epoxy based resin to fill the internal space with the resin, there may be an incomplete filling performance such as generation bubbles in the resin, leakage of the resin out of the casing, and generation of an unfilled portion in the casing. Therefore, when the laser chamber is internally evacuated with the high-voltage capacitor 18 placed in the laser chamber and thereafter the pressure inside the chamber is increased to provide a halogen gas environment, there has been such a problem that the electric characteristic of the high-voltage capacitor 18 abruptly deteriorates due to a possible occurrence of a phenomenon in which the halogen gas intrudes into the casing 6 of the high-voltage capacitor 18 or corrodes the resin leaking out of the casing 6, and a phenomenon in which a gas or powdery dust is generated simultaneously with the corrosion, resulting in contaminating the laser medium gas and degrading the life span of the laser device.

Furthermore, the excimer laser device is a sort of pulse gas laser in which an electric discharge repetitively occurs in the ambient gas to achieve laser oscillation. Therefore, the high-voltage capacitor is used in a severe condition in which the capacitor is exposed to the halogen gas as well as ultraviolet rays and discharge plasma due to the electric discharge. However, the conventional high-voltage capacitor has put only the reaction thereof with the halogen gas into question, and has not taken into account the deterioration caused by ultraviolet rays and discharge plasma due to the electric discharge. Accordingly, there have been problems as follows in realizing practical usage of the capacitor.

(1) The material covering the capacitor body is selected by its anti-halogen gas characteristic, and therefore, a concern arises in that the material may be deteriorated by the ultraviolet rays and discharge plasma generated due to the electric discharge depending on the material.

Particularly, when the exterior surface of the material covering the capacitor body is decomposed by the discharge plasma, the decomposed material scatters in a form of gas or powdery dust, resulting in contaminating the ambient gas and deteriorating the efficiency and life span of the laser device.

(2) A portion covering the capacitor body has no sealing portion, and therefore, a concern arises in that the ambient gas may enter into the hermetic casing during use.

When the ambient gas enters into the hermetic casing, the gas reacts with the insulating protection section to degrade the insulating property, which possibly degrades the dielectric performance or contaminates the ambient gas due to the generation of gas and powdery dust in company with the reaction, resulting in a problem of reducing the life span of the laser device and so forth.

(3) The electrode terminals are made of a material such as copper or brass. This causes a problem in that the electrode material may react with the halogen gas or the ultraviolet rays or discharge plasma generated due to the electric discharge, resulting in contaminating the ambient gas environment.

SUMMARY OF THE INVENTION

Accordingly, it is a first object of the present invention to provide a method of manufacturing a high-voltage capacitor having no such portion which is not filled with the insulating protection material inside the hermetic casing.

A second object of the present invention is to provide a method of manufacturing a high-voltage capacitor in which the insulating protection material to be filled in the hermetic casing does not leak out of the hermetic casing.

A third object of the present invention is to provide a high-voltage capacitor which includes no such portion which is not filled with the insulating protection material inside the hermetic casing and maintains stability against the ambient gas environment including the halogen gas such as $F_2$ or $Cl_2$ by preventing the insulating protection material from leaking out of the hermetic casing.

A fourth object of the present invention is provide a high-voltage capacitor which assures an anti-halogen gas property while at the same time not being deteriorated by the ultraviolet rays or discharge plasma, and is accompanied by neither the possible intrusion of the ambient gas into the hermetic casing nor the possible occurrence of a reaction between the electrode terminals and the ultraviolet rays or discharge plasma.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
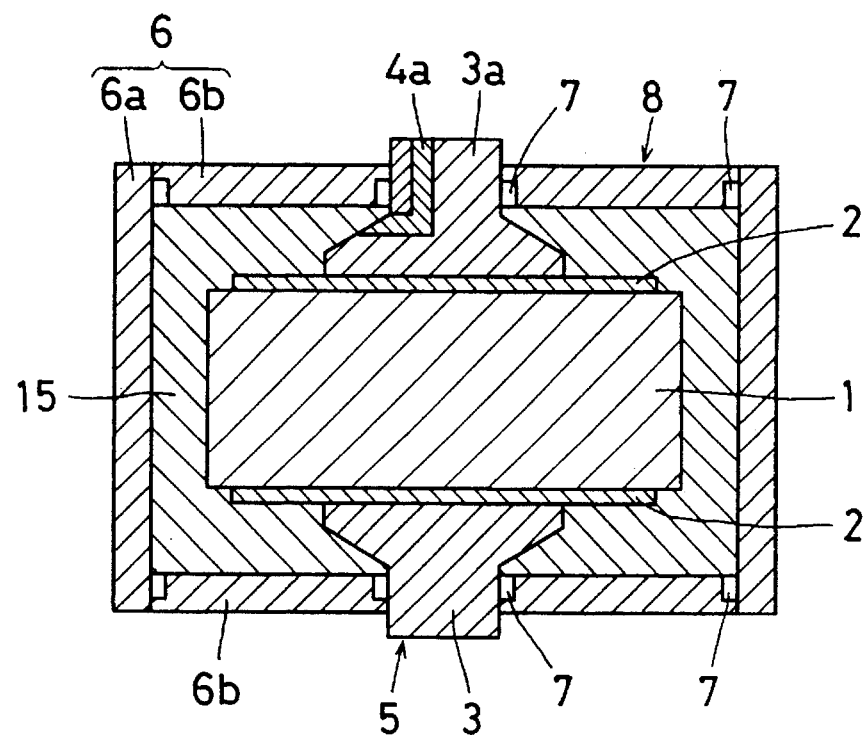
FIG. 1 is a sectional view of a high-voltage capacitor according to a first preferred embodiment of the present invention.

As shown in FIG. 1, a high-voltage capacitor according to a first preferred embodiment of the present invention is formed by coating both end surfaces of a disk-shaped capacitor element 1 made of a dielectric ceramic with electrodes 2 made principally of silver, and baking the resulting capacitor body at a temperature of 750° C. Then, external terminals 3 and 3a are connected to respective electrodes 2. The external terminal 3a is provided with a passage 4a which makes an outermost end and a side surface of a base portion of the external terminal 3a communicate with each other. The above-mentioned high-voltage capacitor body 5 is mounted in a hermetic casing 6 made of a high purity alumina ceramic.

The hermetic casing 6 is composed of a cylindrical section 6a for storing therein the capacitor body 5 and an insulating protection material 15 and lids 6b for sealing opening portions of the cylindrical section 6a. The cylindrical section 6a and the lids 6b are each formed of a ceramic material such as alumina ceramic having a silicon content of not greater than 5% by weight. In the above place, the lids 6b are each provided with a through hole through which the outer end portions of the external terminals 3 and 3a penetrate to protrude outwardly.

The reason why the silicon content of the hermetic casing is limited to 5% by weight or less is that, when the silicon content exceeds 5% by weight, a reaction of the hermetic casing with the halogen gas can not be avoided. It is to be noted that no limitation is imposed on the material of the hermetic casing 6, and the material may be any material so long as the material has a function equivalent to that of alumina or zirconia.

For the purpose of sealing the hermetic casing 6, rubber-like elastic O-rings 7 are provided at connections between the cylindrical section 6a and the lids 6b, and O-rings 7 having the same material property are provided at connections between the lids 6b and the external terminals 3 and 3a, thereby achieving an internally sealed structure. The hermetic casing 6 is internally filled with the insulating protection material 15 to obtain a high-voltage capacitor 8. By virtue of the passage 4a provided through the external terminal 3a, the inside and the outside of the hermetic casing 6 are communicated with each other when the hermetic casing 6 is internally sealed.

Figure 2:
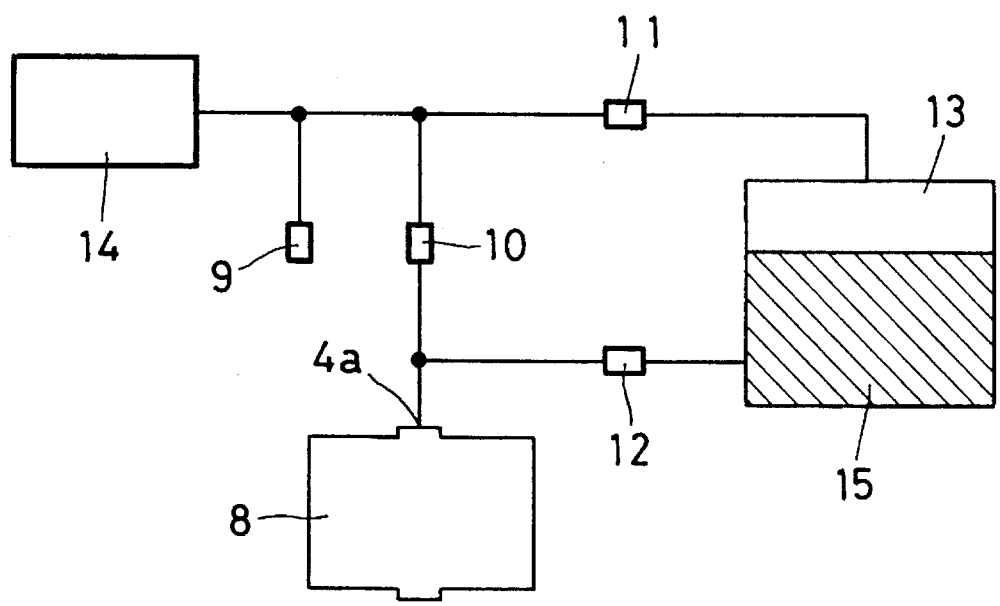
FIG. 2 is a diagram of an insulating protection material injection piping system for filling with an insulating protection material the hermetic casing of the high-voltage capacitor of the first preferred embodiment of the present invention.

A method of filling the hermetic casing 6 of the high-voltage capacitor 8 with the insulating protection material 15 will be described with reference to an insulating protection material piping system as shown in FIG. 2. First of all, a pipe is connected to the passage 4a provided at the terminal 3a, and valves 9 and 12 are closed. Then valves 10 and 11 are opened to sufficiently discharge the gas inside the hermetic casing 6. At the same time, bubbles in a resin bath 13 containing an epoxy based resin which serves as a mold resin of the insulating protection material 15 are removed. Then, the valve 10 is closed, and the valve 12 is opened. Thereafter an operation of an evacuating unit 14 is stopped with the hermetic casing 6 kept internally vacuous. Then by opening the valve 9 to release the resin bath 13 to the atmospheric pressure, the hermetic casing 6 is internally filled with the insulating protection material 15. Subsequently, the resulting capacitor is kept at a temperature of 150° C. for one hour to harden the insulating protection material 15, thereby obtaining the high-voltage capacitor 8.

Figure 3:
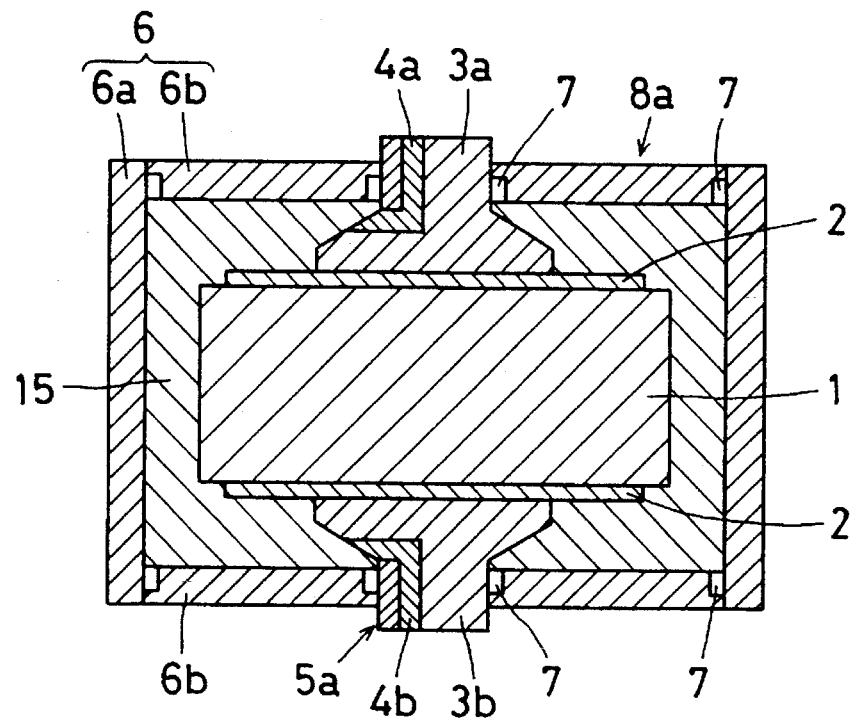
FIG. 3 is a sectional view of a high-voltage capacitor according to a second preferred embodiment of the present invention.

FIG. 3 shows a second preferred embodiment of the present invention. A high-voltage capacitor 8a of the present preferred embodiment is characterized in that both external terminals 3a and 3b are provided with passages 4a and 4b. The other features of the high-voltage capacitor 8a are the same as those of the preferred embodiment shown in FIG. 1. Therefore, like numerals refer to like parts, and no detailed description is provided therefor herein.

Figure 4:
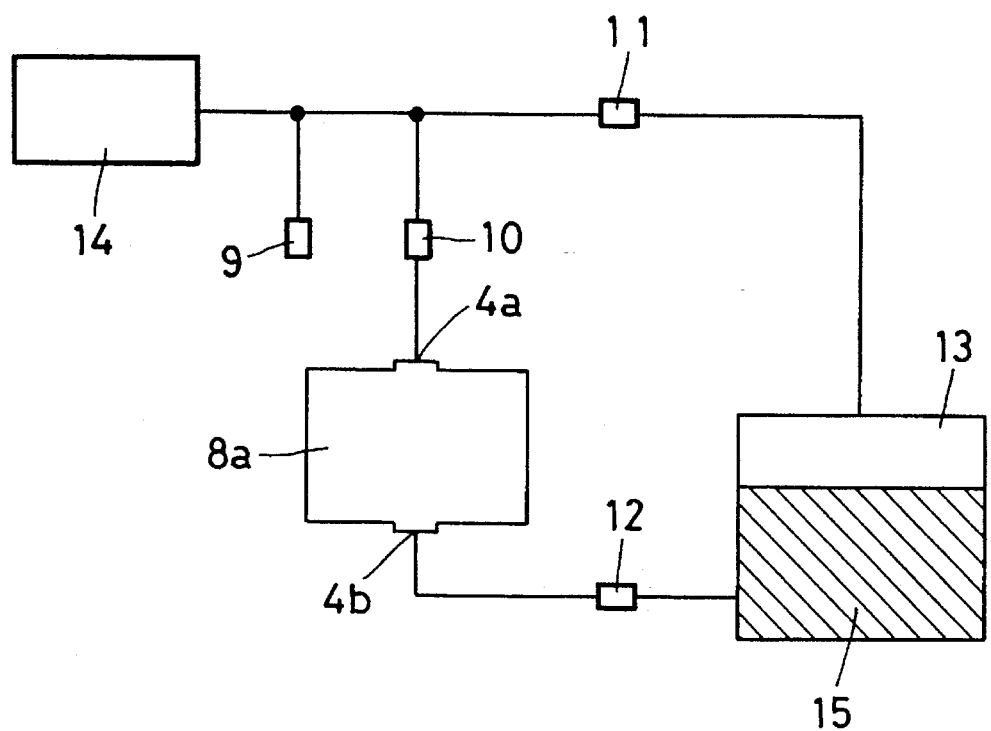
FIG. 4 is a diagram of an insulating protection material injection piping system for filling with an insulating protection material the hermetic casing of the high-voltage capacitor of the second preferred embodiment of the present invention.

A method for manufacturing the high-voltage capacitor 8a shown in FIG. 3 will be described with reference to FIG. 4. First of all, the passage 4a provided at one terminal 3a is connected to a pipe communicated with the evacuating unit 14, while the other passage 4b is connected to a pipe communicated with the resin bath 13. Then the valves 9 and 12 are closed, and the valves 10 and 11 are opened to sufficiently discharge the gas inside the hermetic casing 6. At the same time, bubbles in the resin bath 13 containing an epoxy based resin which serves as a mold resin of the insulating protection material 15 are removed. Then, the valve 10 is closed, and the valve 12 is opened. Thereafter, the operation of the evacuating unit 14 is stopped with the hermetic casing 6 kept internally vacuous. Then by opening the valve 9 to release the resin bath 13 to the atmospheric pressure, the hermetic casing 6 is internally filled with the insulating protection material 15. Subsequently, the resulting capacitor is kept at a temperature of 150° C. for one hour to harden the insulating protection material 15, thereby obtaining the high-voltage capacitor 8a.

Figure 5:
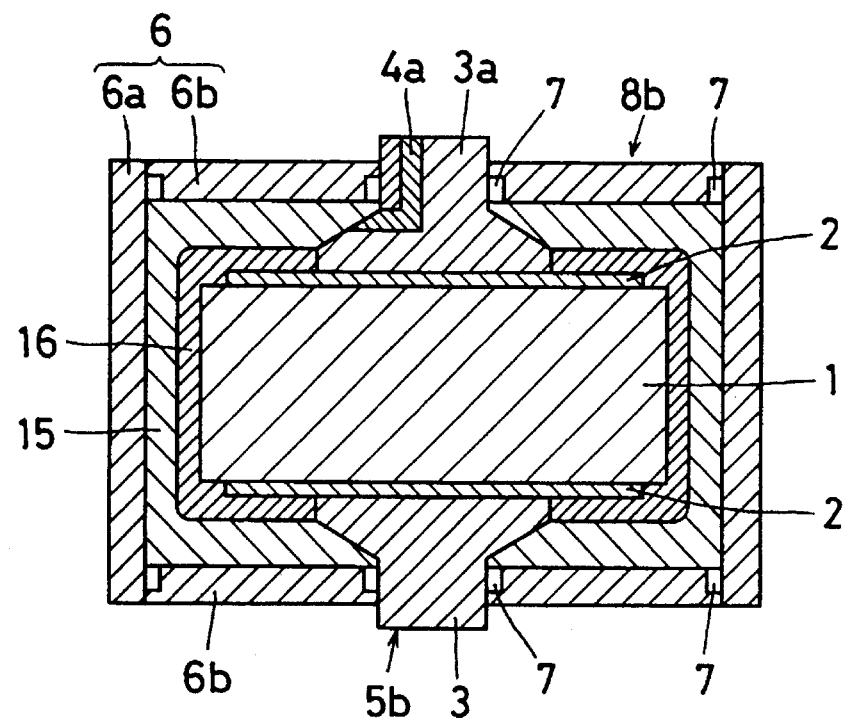
FIG. 5 is a sectional view of a high-voltage capacitor according to a third preferred embodiment of the present invention.

Although the external terminals 3a and 3b are provided with one passage, i.e., each of the passages 4a and 4b, the number of passages may be arbitrary. When a plurality of passages are provided and the hermetic casing 6 is internally filled with the insulating protection material 15, it is required to preliminarily eliminate or close the passages other than the passages 4a and 4b connected to the pipes. Furthermore, the number of the external terminals 3 is not limited to two. Furthermore, the shape of the capacitor element 1 is not limited to the disk shape, and the capacitor element nay have a rectangular plate shape or a pillar shape. The insulating protection material 15 may be made from an insulating protection material which has a liquid state in the injection stage, the material such as silicone based resin, urethane based resin, fluorine based resin, and silicone oil other than epoxy based resin. It is to be noted herein that the epoxy based resin, silicone based resin, urethane based resin, and fluorine based resin are defined to include those incorporating therein an inorganic filler such as silica. In order to ensure the insulating property, a capacitor body 5b which has been preliminarily resin-molded with an insulating protection material 16 such as epoxy based resin as shown in FIG. 5 may be used.

According to the manufacturing method of the present invention, a passage communicated with the inside of the casing is provided at the external terminal, and the gas inside the hermetic casing is discharged through the passage of the external terminal to achieve a reduced pressure. Thereafter, the hermetic casing is internally filled with the insulating protection material. With the above-mentioned arrangement, the casing can be internally filled with the mold resin without any internal space nor leak of the resin out of the casing, thereby allowing a reliable high-voltage capacitor to be manufactured.

Furthermore, according to the high-voltage capacitor of the present invention, the hermetic casing positioned in the outermost position is put in contact with the ambient environment, which means that the insulating protection material which is enclosing the capacitor body as stored in the hermetic casing is not put in direct contact with the halogen gas in the ambient environment. Also, there is neither reaction of the resin with the halogen gas due to the possible leak of the resin out of the casing nor intrusion of the halogen gas into the hermetic casing due to the unfilled portion. By providing the hermetic casing by a ceramic having a silicon content of not greater than 5% by weight, the casing do not react with the halogen gas, thereby suppressing the possible deterioration due to the reaction.

Figure 6:
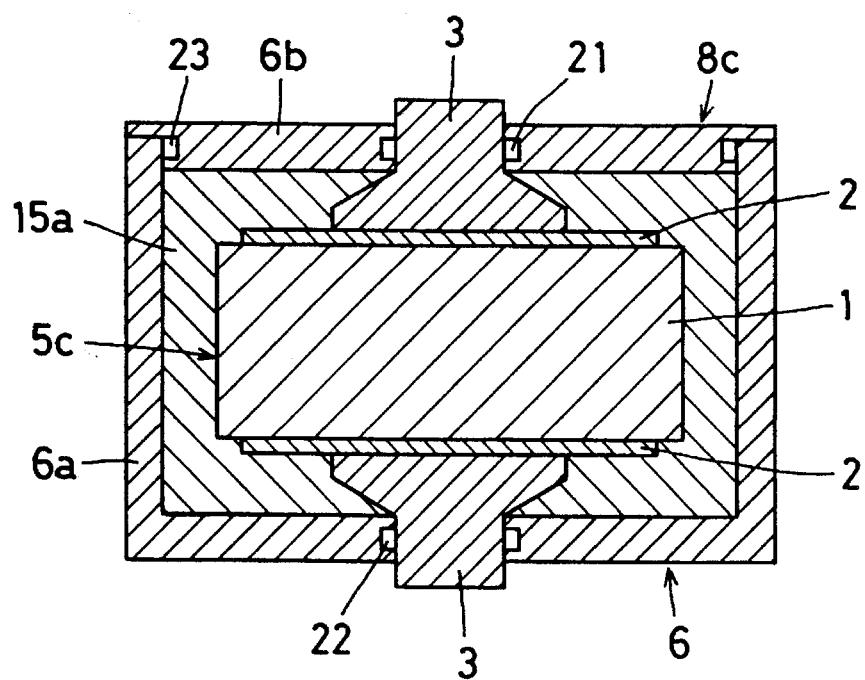
FIG. 6 is a longitudinally sectional front view of a high-voltage capacitor according to a fourth preferred embodiment of the present invention.

Then, a high-voltage capacitor according to a fourth preferred embodiment will be described with reference to FIG. 6. The high-voltage capacitor is comprised of a capacitor body 5c, an insulating protection material 15a which covers the entire peripheral surface of the capacitor body, and a hermetic casing 6 for storing them. There are provided sealing sections 21, 22, and 23 at connections of the casing 6 and at portions of the casing 6 through which the capacitor body 5c penetrates.

The capacitor body 5c is formed by providing baked planar electrodes 2 and 2 coated with silver paste or the like on both end surfaces of a capacitor element 1 made of a material such as a dielectric ceramic, and fixing external terminals 3 and 3 by soldering or another means to the planar electrodes 2 and 2, respectively.

The insulating protection material 15 is made of epoxy resin, and covers the capacitor element 1 and a part of each of the external terminals 3 and 3 in a mold.

The hermetic casing 6 is composed of a casing body 6a having a bottom-like portion for internally storing an insulating protection material 15a and a lid 6b for closing an upper opening of the casing body 6a. The casing 6 is formed of a ceramic material, preferably alumina, having an anti-halogen gas property, an anti-ultraviolet ray property, and an anti-discharge plasma property.

It is effective for the above-mentioned ceramic material to be formed of high purity aluminum oxide having a silicon content of not greater than 5% by weight. When an alumina material having a silicon content of greater than 5% by weight is used, the reaction between the halogen gas and the casing 6 can not be avoided. It is to be noted that the material to be used as the casing 6 is not limited, and the material may be any material so long as the material has a function equivalent to that of alumina.

The aforementioned external terminals 3 and 3 are formed of brass, and plated with a material having the anti-halogen gas property and the anti-ultraviolet ray property, the material being, for example, nickel. It is to be noted that the surface material of the electrode terminals may be provided by a material having a function equivalent to that of nickel, such as Cu or Al.

The surface of the electrode terminals may be provided with a material having the anti-halogen gas property, the anti-ultraviolet ray property, and the anti-discharge plasma property by means of sputtering, vapor deposition, or the like instead of the plating. Also, the electrode terminals may be made of a material having the anti-halogen gas property and the anti-ultraviolet ray property, such as Ni, Cu, or Al.

The sealing sections 21, 22, and 23 provided at the portions where the external terminals 3 and 3 penetrate the bottom portion of the casing body 6a and the lid 6b and the connection between the casing body 6a the lid 6b at the aforementioned hermetic casing 6 are each formed of an O-ring, a sheet, a packing, a gasket, or the like made of fluororubber. The fluororubber has an anti-halogen gas function.

The high-voltage capacitor of the fourth preferred embodiment has the construction as described above. The casing body 6a and the lid 6b are each formed of a high purity alumina ceramic having a silicon content of not greater than 5% by weight, and O-rings which are to serve as the sealing sections 21, 22, and 23 are set at the casing body 6a and the lid 6b.

The capacitor body 5c composed of the capacitor element 1 and both the electrode terminals are inserted in the casing body 6a, which is followed by injection molding of the insulating protection material 15a as well as fitting and fixing of the lid 6b to the upper opening of the casing body 6a. In the above-mentioned condition, the outermost end portions of both the external terminals 3 and 3 are penetrating the bottom portion of the casing body 6a and the lid 6b to protrude outwardly.

By hardening the insulating protection material 15a injection-molded in the above-mentioned condition at a temperature of 150° C. for one hour, the high-voltage capacitor is completed.

Figure 7:
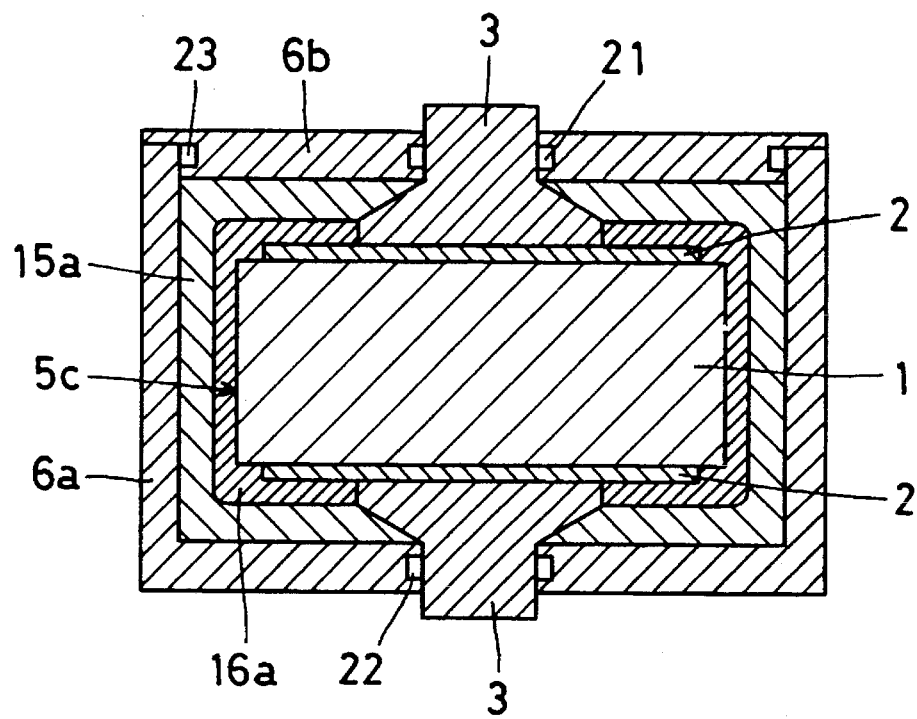
FIG. 7 is a longitudinally sectional front view of a high-voltage capacitor according to a fifth preferred embodiment of the present invention.
Figure 8:
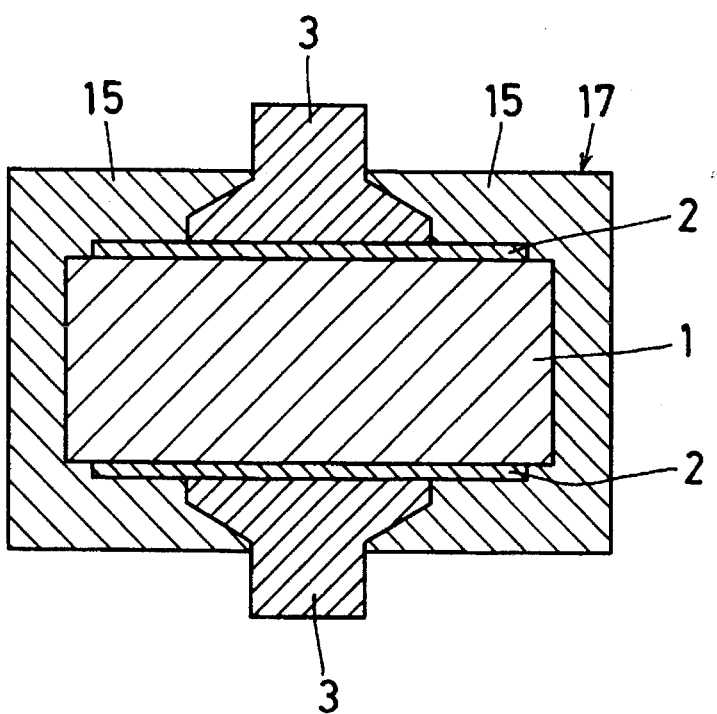
FIG. 8 is a sectional view of a conventional high-voltage capacitor.
Figure 9:
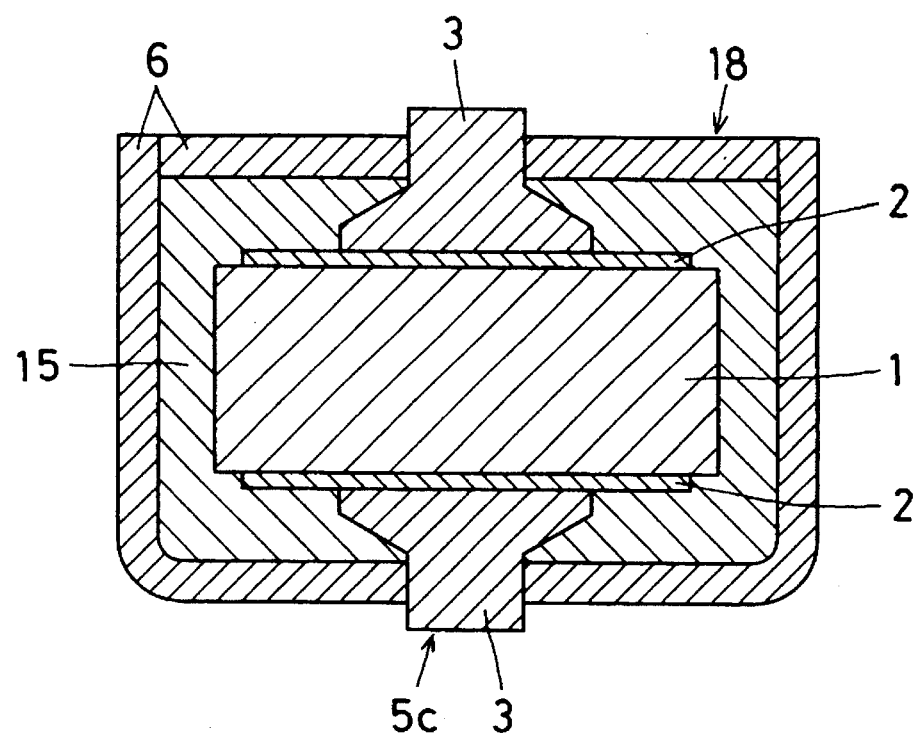
FIG. 9 is a sectional view of another conventional high-voltage capacitor.

In a fifth preferred embodiment as shown in FIG. 7, the insulating protection portion is composed of two layers of insulating protection portions 15a and 16a. In the present case, the capacitor is manufactured by inserting a mold unit formed by molding the capacitor body 5c with the insulating protection material 16a into the casing body 6a, injection-molding the insulating protection material 15a, fitting the lid 6b, and hardening the insulating protection material 15a. The insulating protection material 16a is made of epoxy resin, while the insulating protection material 15a is required to be made of a flexible insulating resin such as silicone resin, epoxy resin, or urethane resin.

Even when each of the high-voltage capacitors of the fourth and fifth preferred embodiments is used in such an ambient environment including halogen gas as in the excimer laser device, since the casing 6 is formed of alumina having the anti-halogen gas property, the anti-ultraviolet ray property, and the anti-discharge plasma property and the exterior surfaces of the external terminals 3 and 3 protruding from the casing 6 are plated with nickel, the casing 6 does not deteriorate due to the ultraviolet rays and discharge plasma generated by the electric discharge. Furthermore, since neither the casing 6 nor the external terminals 3 and 3 does not contaminate the ambient gas environment, the efficiency of the laser device is not reduced.

Furthermore, the sealing sections 21, 22, and 23 provided at the connection of the casing 6 and the portions through which the external terminals 3 and 3 penetrate can prevent the ambient gas from entering into the casing 6.

It is to be noted that the high-voltage capacitor of the present invention is not always required to be used in an excimer laser device.

According to the fourth and fifth preferred embodiments as described above, the possible occurrence of the reaction and the deterioration of the casing and the external terminals can be prevented even through they are exposed to ultraviolet rays and discharge plasma due to electric discharge in the ambient gas including the halogen gas. Furthermore, since there is no intrusion of the ambient gas into the casing, the possible internal deterioration of the capacitor is eliminated, and the ambient gas is prevented from being contaminated, thereby preventing the efficiency of the laser device from reducing.

What is claimed is:

1. A high-voltage capacitor manufacturing method comprising the steps of: enclosing in a hermetic casing a capacitor body provided with an electrode connected to an external terminal, the external terminal including a passageway therein for making an inside of the hermetic casing communicate with an outside of the hermetic casing while the external terminal is led out of the hermetic casing from the electrode of the capacitor body; discharging a gas from the inside of the hermetic casing by way of the passageway within the external terminal to reduce the pressure inside the hermetic casing; and filling the inside of the hermetic casing with an insulating material.

2. A high-voltage capacitor manufacturing method as claimed in claim 1, wherein the hermetic casing is made of a ceramic having a silicon content of not greater than 5% by weight.

3. A high-voltage capacitor manufacturing method claimed in claim 2, wherein the insulating protection material is made of any of epoxy based resin, silicons based resin, urethane based resin, fluorine based resin and silicone oil.

4. A high-voltage capacitor comprising: a hermetic casing; a capacitor body enclosed within the hermetic casing and spaced from an inner wall of the hermetic casing so as to define a space between the capacitor body and the hermetic casing; external terminals which are electrically connected to electrodes provided for the capacitor body and which are led out of the hermetic casing; and an insulating protection material which fills in the space defined between the hermetic casing and the capacitor body, wherein at least one of the external terminals includes passageway therein for making an inside of the hermetic casing communicate with an outside of the hermetic casing.

5. A high-voltage capacitor as claimed in claim 4, wherein the hermetic casing is made of a ceramic having a silicon content of not greater than 5% by weight.

6. A high-voltage capacitor as claimed in claim 4, wherein the insulating protection material is made of any of epoxy based resin, silicone based resin, urethane based resin, fluorine based resin, and silicone oil.

7. A high-voltage capacitor having at least two external terminals, wherein an exterior surface of the capacitor body is provided with an armor made of a material having an anti-halogen gas property, an anti-ultraviolet ray property, and an anti-discharge plasma property.

8. A high-voltage capacitor as claimed in claim 7, wherein the material having the anti-halogen gas property, the anti-ultraviolet ray property, and the anti-discharge plasma property is alumina.

9. A high-voltage capacitor as claimed in claim 7, wherein exterior surfaces of the external terminals are made of a material having the anti-halogen gas property and the anti-ultraviolet ray property.

10. A high-voltage capacitor as claimed in claim 7, wherein the armor of the capacitor body has a sealable container shape, and a sealing mechanism is provided at portions of the casing through which the external terminals penetrate and at a wall-to-wall connection of the casing.

11. A high-voltage capacitor as claimed in claim 8, wherein the material of alumina has a silicon content of not greater than 5% by weight.

12. A high-voltage capacitor as claimed in claim 8, wherein exterior surfaces of the external terminals are made of a material having the anti-halogen gas property and the anti-ultraviolet ray property.

13. A high-voltage capacitor as claimed in claim 8, wherein the armor of the capacitor body has a sealable container shape, and a sealing mechanism is provided at portions of the casing through which the external terminals penetrate and at a wall-to-wall connection of the casing.

14. A high-voltage capacitor as claimed in claim 11, wherein exterior surfaces of the external terminals are made of a material having the anti-halogen gas property and the anti-ultraviolet ray property.

15. A high-voltage capacitor as claimed in claim 11, wherein the armor of the capacitor body has a sealable container shape, and a sealing mechanism is provided at portions of the casing through which the external terminals penetrate and at a wall-to-wall connection of the casing.

16. A high-voltage capacitor as claimed in claim 9, wherein the armor of the capacitor body has a sealable container shape, and a sealing mechanism is provided at portions of the casing through which the external terminals penetrate and at a wall-to-wall connection of the casing.

* * * * *